(12) United States Patent
Simon et al.

(10) Patent No.: US 10,706,381 B2
(45) Date of Patent: Jul. 7, 2020

(54) VEHICLE AND DRONE MANAGEMENT SYSTEM

(71) Applicant: Omnitracs, LLC, Dallas, TX (US)

(72) Inventors: Stephen P. Simon, Sparks, MD (US); Wesley M. Mays, Coppell, TX (US)

(73) Assignee: Omnitracs, LLC, Dallas, TX (US)

( * ) Notice: Subject to any disclaimer, the term of this patent is extended or adjusted under 35 U.S.C. 154(b) by 237 days.

(21) Appl. No.: 15/642,027

(22) Filed: Jul. 5, 2017

(65) Prior Publication Data

US 2019/0012636 A1 Jan. 10, 2019

(51) Int. Cl.
*G06Q 10/08* (2012.01)
*B64C 39/02* (2006.01)
(Continued)

(52) U.S. Cl.
CPC ....... *G06Q 10/0832* (2013.01); *B64C 39/024* (2013.01); *G01C 21/34* (2013.01); *G01C 21/343* (2013.01); *G01C 21/3423* (2013.01); *G05D 1/0027* (2013.01); *G05D 1/0297* (2013.01); *G05D 1/102* (2013.01); *G08G 1/202* (2013.01); *G08G 5/006* (2013.01); *G08G 5/0013* (2013.01); *G08G 5/0043* (2013.01); *G08G 5/0069* (2013.01); *G08G 7/00* (2013.01); *B64C 2201/024* (2013.01); *B64C 2201/042* (2013.01);
(Continued)

(58) Field of Classification Search
CPC .............. G06Q 10/0832; B64C 39/024; B64C 2201/024; B64C 2201/042; B64C 2201/066; B64C 2201/128; B64C 2201/145; B64C 2201/146; G05D 1/0027; G08G 1/202; G08G 5/0013; G08G 5/0043; G08G 5/006; G08G 5/0069
See application file for complete search history.

(56) References Cited

U.S. PATENT DOCUMENTS 9,359,074 B2 6/2016 Ganesh et al.
9,678,507 B1 6/2017 Douglas et al.
(Continued)

OTHER PUBLICATIONS

Geographic Significance of Delivery Zones in an Ecommerce Enabled Grocery Delivery Strategy, Herrell, Keith, 2006, University of Florida, p. 81 (Year: 2006).*
(Continued)

*Primary Examiner* — Kevin H Flynn
*Assistant Examiner* — Michelle E Carey
(74) *Attorney, Agent, or Firm* — Arent Fox LLP

(57) ABSTRACT

The disclosure provides a system and method of delivering packages. The system may include a plurality of land vehicles that transport a plurality of unmanned aerial vehicles (UAVs) to locations within a distance of delivery destinations. The system may determine, based on a number of packages to be delivered to destinations in a geographical area, a number of land vehicles to carry the packages to within a UAV round-trip range of each of the destinations. The system may allocate the number of packages to the number of land vehicles. The system may determine a route for each land vehicle that brings the land vehicle within the UAV round-trip range of each destination. The system may dispatch the UAVs carrying the packages from the land vehicle at dispatch locations along the respective route.

18 Claims, 5 Drawing Sheets

(51) Int. Cl.
*G01C 21/34* (2006.01)
*G05D 1/00* (2006.01)
*G08G 5/00* (2006.01)
*G08G 1/00* (2006.01)
*G05D 1/10* (2006.01)
*G08G 7/00* (2006.01)
*G05D 1/02* (2020.01)

(52) U.S. Cl.
CPC .. *B64C 2201/066* (2013.01); *B64C 2201/128* (2013.01); *B64C 2201/145* (2013.01); *B64C 2201/146* (2013.01); *G05D 2201/0213* (2013.01)

(56) References Cited

U.S. PATENT DOCUMENTS

| | | | |
|---|---|---|---|
| 9,792,576 B1* | 10/2017 | Jamjoom | G06Q 10/0832 |
| 10,222,798 B1* | 3/2019 | Brady | G05D 1/0278 |
| 2007/0043634 A1* | 2/2007 | Bar | G06Q 10/063 |
| | | | 705/28 |
| 2008/0144884 A1 | 6/2008 | Habibi | |
| 2012/0232718 A1 | 9/2012 | Rischmuller et al. | |
| 2013/0281133 A1* | 10/2013 | Davidson | G08G 1/13 |
| | | | 455/457 |
| 2014/0067167 A1 | 3/2014 | Levien et al. | |
| 2014/0316243 A1 | 10/2014 | Niedermeyer | |
| 2014/0330456 A1 | 11/2014 | Lopez Morales et al. | |
| 2015/0006005 A1* | 1/2015 | Yu | G06Q 50/28 |
| | | | 701/22 |
| 2015/0120094 A1 | 4/2015 | Kimchi et al. | |
| 2015/0248640 A1 | 9/2015 | Srinivasan | |
| 2015/0301150 A1 | 10/2015 | Stuckman et al. | |
| 2015/0317597 A1 | 11/2015 | Shucker et al. | |
| 2015/0370251 A1 | 12/2015 | Siegel et al. | |
| 2016/0101874 A1 | 4/2016 | McKinnon et al. | |
| 2016/0107750 A1 | 4/2016 | Yates | |
| 2016/0307449 A1* | 10/2016 | Gordon | G08G 5/0069 |
| 2016/0327959 A1* | 11/2016 | Brown | G08G 5/0069 |
| 2017/0129603 A1 | 5/2017 | Raptopoulos et al. | |
| 2017/0230154 A1* | 8/2017 | Tavildar | H04L 5/0037 |
| 2017/0341795 A1* | 11/2017 | Colson | B33Y 10/00 |
| 2018/0053139 A1* | 2/2018 | Stoman | G06Q 10/083 |

OTHER PUBLICATIONS

International Search Report and Written Opinion issued in International Patent Application No. PCT/US2018/027911 dated Sep. 6, 2018.

* cited by examiner

VEHICLE AND DRONE MANAGEMENT SYSTEM

BACKGROUND

The present disclosure generally relates to a system for managing vehicles, including managing the interaction of manned vehicles and unmanned drones.

Conventionally, systems may manage the operation of a fleet of vehicles. For example, systems may manage vehicles that deliver packages or cargo. One inefficiency in such systems is that the last leg of a delivery operation (e.g., from a sorting facility to a destination address) has been performed by a delivery person who both drives a delivery vehicle and manually carries the package from the delivery vehicle to the destination address.

Various drone delivery systems have been proposed where an unmanned aerial vehicle (UAV) carries a package from the sorting facility to the destination address. Such systems, however, are limited to the round-trip range of the UAV and would require a large number of sorting facilities in order to cover a geographic area.

In view of the above, it can be appreciated that there are problems, shortcomings or disadvantages associated with drone delivery systems, and that it would be desirable if improved systems and methods for delivering packages using UAVs were available.

SUMMARY

The following presents a simplified summary of one or more aspects of the invention in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

In one aspect, the disclosure provides a method of delivering packages. The method may include determining, based on a number of packages to be delivered to destinations in a geographical area, a number of land vehicles to carry the packages to within an unmanned aerial vehicle (UAV) round-trip range of each of the destinations. Each land vehicle may carry at least one UAV capable of delivering at least one of the number of packages to one of the destinations within the UAV round-trip range. The method may include allocating the number of packages to the number of land vehicles, each land vehicle being allocated a set of destinations. The method may include determining a route for each land vehicle that brings the land vehicle within the UAV round-trip range of each destination within the set of destinations. The method may include dispatching, for each destination, a UAV carrying the package from the land vehicle at a dispatch location along the respective route.

In another aspect, the disclosure provides a system for delivering packages. The system may include a plurality of land vehicles and a plurality of UAVs. The system may include a computer system comprising a memory storing computer executable instructions and a processor. The processor may be configured to determine, based on a number of packages to be delivered to destinations in a geographical area, a number of the land vehicles to carry the packages to within a UAV round-trip range of each of the destinations. The processor may be configured to allocate the number of packages to the number of land vehicles, each land vehicle being allocated a set of destinations. The processor may be configured to determine a route for each land vehicle that brings the land vehicle within the round-trip range of each destination within the set of destinations. The processor may be configured to dispatch, for each destination, a UAV carrying the package from the land vehicle at a dispatch location along the respective route.

These and other aspects of the invention will become more fully understood upon a review of the detailed description, which follows.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Unmanned aerial vehicles (UAVs) or drones offer many opportunities in the logistics and shipping fields. UAVs may provide fast delivery times by bypassing fixed road routes and traffic congestion. UAVs may also perform the last leg of delivery, placing the package at the address, which is typically performed by a human.

UAVs, however, also present difficulties in comparison to the management of vehicles using traditional delivery methods. Management systems have to consider cargo capacity and delivery range, which are factors that limit the ability of UAVs to deliver packages. The amount of fixed infrastructure to support full UAV delivery over a large geographic area may be expensive. Additionally, autonomous UAVs are likely to experience unpredictable events and malfunctions that require human involvement.

The present disclosure provides for a hybrid vehicle and drone management system in which land vehicles transport packages from a warehouse to dispatch locations and delivery UAVs perform a last leg of delivery to the delivery addresses. The hybrid system increases capacity by utilizing the higher cargo capacity of the land vehicles for a majority of the delivery distance while utilizing one or more UAVs for rapid delivery to final destinations.

The present disclosure further provides for a routing system that allocates packages to the land vehicles, plans routes for the land vehicles and UAVs, and dispatches the UAVs to the delivery locations.

Figure 1:
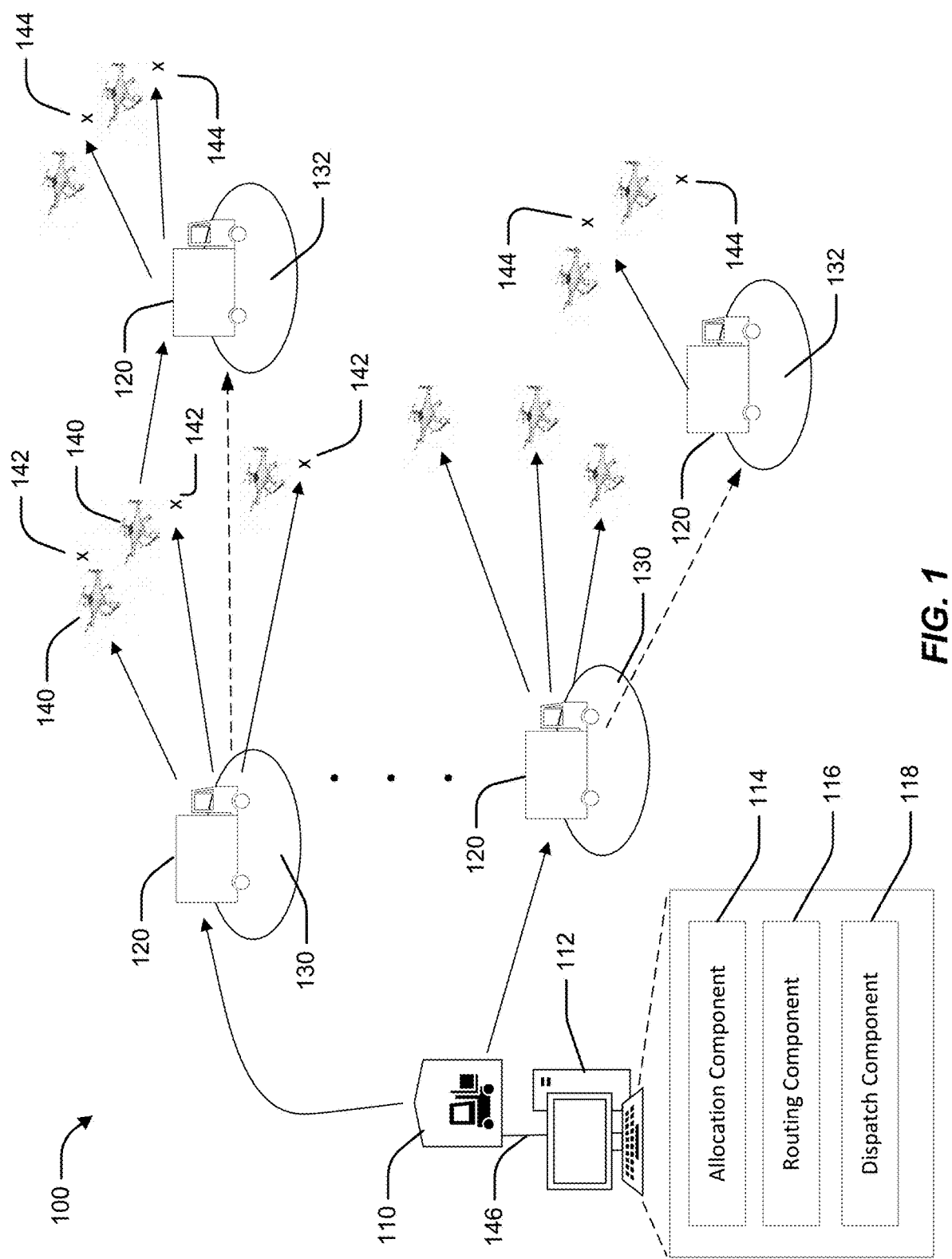
FIG. 1 is a conceptual diagram of an example vehicle and drone management system.

Turning now to the Figures, FIG. 1 illustrates an example vehicle and drone management system 100. The management system 100 includes a warehouse 110, land vehicles 120, and UAVs 140. The management system 100 routes one or more land vehicles 120 from the warehouse 110 to one or more first dispatch locations 130. At the respective first dispatch locations 130, the UAVs 140 are dispatched from the land vehicles 120 to deliver packages to one or more final destinations 142. In some cases, the UAVs 140 may then return to the land vehicles 120 at a pickup location and are driven to other dispatch locations for delivery of one or more additional packages to one or more additional final destinations 144. In an aspect, the pickup location may be the same as the dispatch location 130 or 132. In an aspect, the land vehicles 120 may move from a respective first dispatch location 130 to a second dispatch location 132. In some cases, one or more UAVs 140 may be dispatched from the first dispatch location 130, but return to the land vehicle 120 at the second dispatch location 132 (which may be considered a pickup location), depending on a routing plan for a particular delivery zone.

The warehouse 110 may be a central facility for a geographic region. In an aspect, for example, the warehouse 110 may include an inventory for one or more retailers. As products are ordered, the management system 100 may control one or more parts of the process of pulling the products from the inventory, packaging the products, and allocating the packages for delivery, which is controlled by the management system 100. In another aspect, the warehouse 110 may be a shipping or sorting facility. The warehouse 110 may receive packages (e.g., via long-haul trucking, air cargo, ship, or rail) and allocate the received packages for delivery. The management system 100 may allocate packages for delivery on a periodic, volume, and/or demand basis. For example, the management system 100 may allocate packages for a daily delivery, but may also allocate packages for supplemental deliveries as volume or demand requires.

A specially-configured vehicle and drone management computer system 112 for management of vehicles and drones, which may be located in the warehouse 110 or in a remote location connected to the warehouse 110 via a wired or wireless communication link 146, may be configured to perform various operations described herein. For example, the vehicle and drone management computer system 112 may include an allocation component 114 for determining, based on a number of packages to be delivered to final destinations 142 and/or 144 in a geographical area, a number of land vehicles 120 to carry the packages and allocating the packages to the land vehicles 120. The computer system 112 may also include a routing component 116 for determining a route for each land vehicle 120 that brings the land vehicle 120 within the distance of each final destination 142 and/or 144. The computer system 112 may include a dispatch component 118 for dispatching, for each final destination 142 and 144, a UAV carrying the package from the land vehicle 120. In an aspect, the vehicle and drone management computer system 112 may include a computer-readable medium storing computer executable code for implementing each of the allocation component 114, routing component 116, and dispatch component 118. In another aspect, the vehicle and drone management computer system 112 may be implemented as a virtual server in a cloud system where computing resources are allocated as necessary. One or more instances of the allocation component 114, routing component 116, or dispatch component 118 may be implemented as a non-transitory computer executable code for execution by one or more processors of the cloud system.

The land vehicles 120 may be vehicles that transport packages and UAVs 140 over a road network. In an aspect, for example, the land vehicles 120 may be commercial delivery vehicles equipped for dispatching drones. For example, in addition to a traditional cargo bay, the land vehicles 120 may each include a UAV bay for storing one or more UAVs 140. The UAVs 140 may autonomously return to the UAV bay after completing a delivery. The land vehicles 120 may also include UAV support equipment, such as fuel, fuel cells, replacement batteries, or battery chargers for refreshing power on the UAVs 140 to increase or maintain the delivery range of the UAVs 140.

In an aspect, the land vehicles 120 may be autonomous or semi-autonomous vehicles. The land vehicles 120 may receive a planned route from the routing component 116 of the vehicle and drone management computer system 112. The land vehicles 120 may autonomously navigate from the warehouse 110 to each dispatch location 130 and/or 132 according to the planned route. An operator may serve as a backup driver while the land vehicle 120 navigates autonomously. The operator may perform additional loading, dispatch, retrieval, and maintenance operations on the UAVs 140 when at the dispatch location 130.

The dispatch location 130 and/or 132 may be a specific location or a location within a geographic area where UAVs 140 may be moved via land vehicles 120 to initiate package delivery to one or more final destinations 142 and/or 144 within a range of the UAVs 140 at the dispatch location 130 and/or 132. The dispatching of UAVs 140 may be regulated by federal, state, or local rules. The ability to dispatch UAVs 140 may also be impacted by practical concerns not specifically regulated. For example, the land vehicle 120 may need to park, stand, or have a limited amount of movement for a threshold amount of time at the dispatch location 130 and/or 132 in order for each UAV 140 to deliver its package and return to the land vehicle 120. The vehicle and drone management computer system 112 may be configured with a database of potential dispatch locations 130 and/or 132 within a delivery zone. The dispatch locations 130 and/or 132 for a particular planned route may be selected when planning the route based on the allocated packages. The land vehicle 120 may also dynamically select or modify dispatch locations 130 and/or 132 based on current conditions at a time of arrival. For example, if a designated parking area at a dispatch location 130 and/or 132 is occupied, the vehicle and drone management computer system 112 and/or the land vehicle 120 may select a nearby dispatch location 130 and/or 132 not included in the route. Two or more nearby dispatch locations 130 and/or 132 may be selected to cover all delivery destinations.

The UAVs 140 may include any UAV capable of delivering packages to a destination 142 and/or 144. In an aspect, the UAVs 140 are aircraft, such as but not limited to electrically powered, multi-rotor helicopters. Other UAVs may be powered by internal combustion engines. UAVs 140 may also include fixed-wing, tiltrotor, or lighter-than-air aircraft. The UAVs 140 may be equipped with a camera, a satellite-based and/or terrestrial-based location system (e.g., global positioning system (GPS)), and a wireless communication device (e.g., a cellular and/or Wi-Fi modem). Each UAV 140 may carry one or more packages having a total weight up to a maximum load for the UAV 140. Further, each UAV 140 may be equipped with releasable package rack for retaining the package during flight and releasing the package at the destination 142 and/or 144.

Each UAV 140 may have a maximum range, e.g., a maximum distance that it can fly on a given battery charge. The maximum range of each UAV 140 may be dependent on multiple variables including the battery capacity, charge level of the batteries, altitude, temperature, wind, and the size, aerodynamic properties, and weight of the payload (e.g., one or more packages). The maximum range may be determined for each model of UAV 140 utilized by the management system 100. The vehicle and drone management computer system 112 may repeatedly estimate a current range for a given UAV 140 based on observed measurements of the above variables. The vehicle and drone management computer system 112 can calculate a round trip distance for each UAV 140 based on the current range, but also taking into account a safety margin. The safety margin may be an additional estimated distance to allow unexpected events (e.g., delays, obstructions, or weather), and to promote safe operations, so that the UAV 140 could be assured a safe return to the dispatch location 130 and/or 132 and/or to the land vehicle 120.

Figure 2:
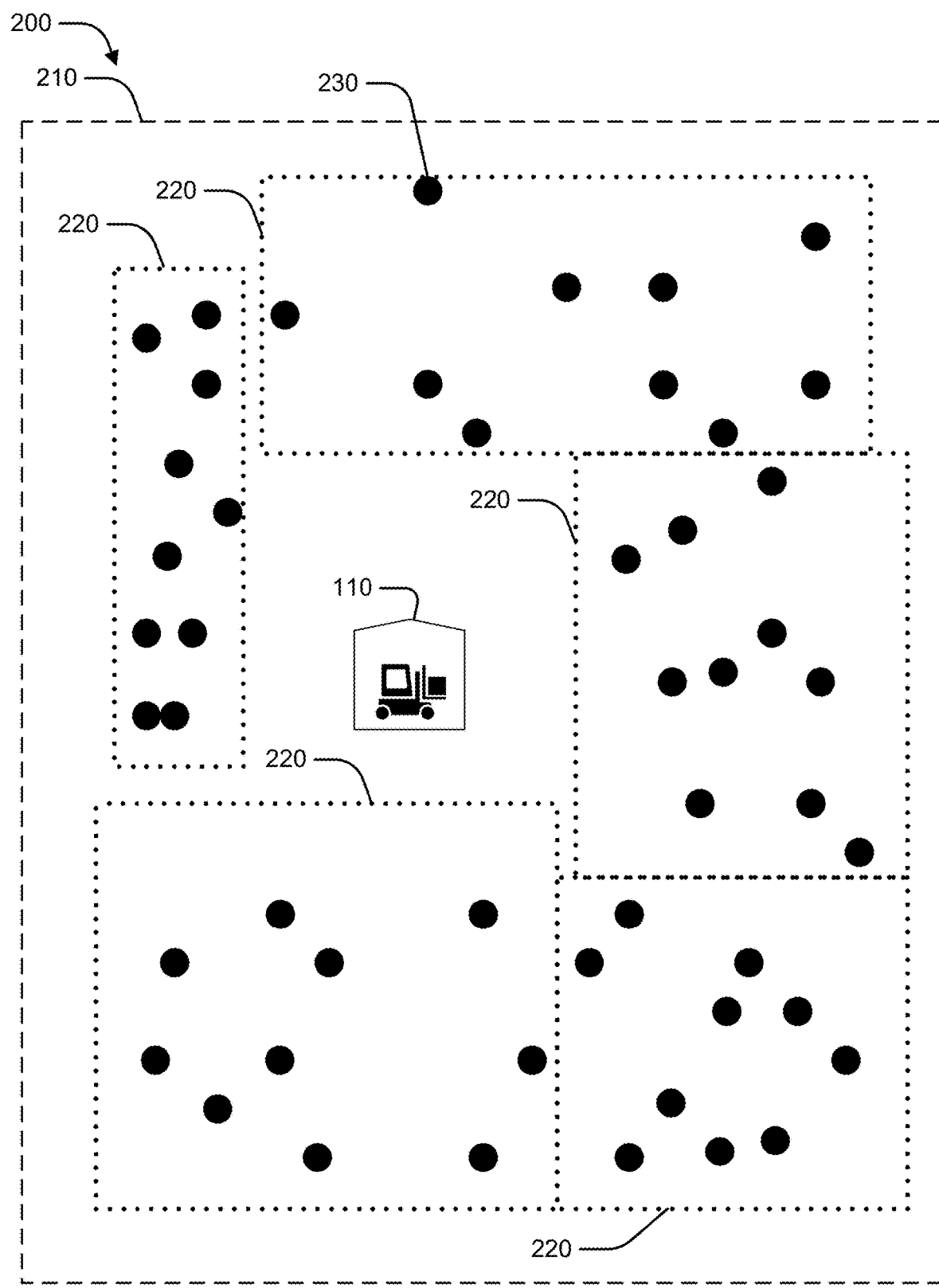
FIG. 2 is a conceptual diagram of example delivery zones.

FIG. 2 is a conceptual diagram 200 of example delivery zones 220 within a geographic region 210. The vehicle and drone management computer system 112 may manage deliveries within the geographic region 210. The geographic region 210 may be any geographic area corresponding to a respective warehouse 110 that can receive and support delivery of one or more packages having a final destination 230 within the geographic region 210. It should be noted that final destination 230 in FIG. 2 may correspond to final destinations 142 and/or 144 of FIG. 1. For example, the warehouse 110 may be responsible for a city, county, or small state, or an arbitrary area having a number of potential customers. The vehicle and drone management computer system 112 may determine a given delivery destination 230 for each package, for example, by reading a label attached to the package. The vehicle and drone management computer system 112 may allocate the packages or associated destinations 230 to delivery zones 220 based on the geographic coordinates of the destinations 230. The destinations 230 may be grouped together. The size of the groups may depend on the cargo capacity of each land vehicle 120. As illustrated, for example, the destinations 230 may be clustered into groups of 10. It should be appreciated that the vehicle and drone management computer system 112 may use larger or smaller groups, and the number of packages in a group may be based on package volume, and/or package weight, and/or a geographic area and/or specific distances covered by each geographic region 210 or between the group of destinations 230, instead of or in addition to the number of packages or destinations 230.

In an implementation, the vehicle and drone management computer system 112 may receive or allocate a large number ("n") packages, i.e. n>>1, that are to be delivered to some number of destinations ("y"). The number of destinations, y, may also include pick up locations. For example, vehicle and drone management computer system 112 may receive requests to pick up a package at a location. For planning purposes, a pick-up location and the associated package may be treated in a similar manner as a delivery because the costs are similar. In an aspect, a pick-up operation may simply be the inverse of a delivery operation in which the package is transported from the destination, but the round-trip distance for the UAV 140 remains the same. The vehicle and drone management computer system 112 may group multiple final destinations 230 into geocentrically-arranged delivery zones 220. The vehicle and drone management computer system 112 may assign a dispatch area to each final destination 230 based on the maximum range of the UAV 140, which may be a round trip range. Assuming that some of the packages may be delivered to the same destination, the number of packages to be delivered will be greater than or equal to the number of destinations; i.e. "n≥y".

The land vehicles 120 may be capable of carrying one or more UAVs 140. The vehicle and drone management computer system 112 may determine the number, "v," of land vehicles 120 for delivering the n packages based on number of packages, cargo capacity of the vehicles, and the distances from the destinations, y. Other factors that may affect the number of vehicles include the size, weight, priority, timing requirements, and handling instructions for each package. The number of vehicles "v" used to deliver the UAVs 140 to the final destinations 230 will likely be less than or equal to the number of final destinations 230, "v≤y" because each land vehicle 120 will be able to carry one or more UAVs 140 and each UAV 140 will be able to make one or more deliveries of packages to the various locations, "y".

Thus, in the illustrated example of FIG. 2, the vehicle and drone management computer system 112 may associate a single warehouse 110 to support multiple delivery zones 220 within the geographic region 210. Further, as will be explained in more detail in FIG. 3, the vehicle and drone management computer system 112 may allocate one or more land vehicles 120 (not shown) to each of the multiple delivery zones 220, may allocate corresponding packages to each land vehicle 120, and control one or more UAVs 140 on each land vehicle 120 to deliver the packages to the corresponding final destinations 230 within the respective delivery zone 220.

Figure 3:
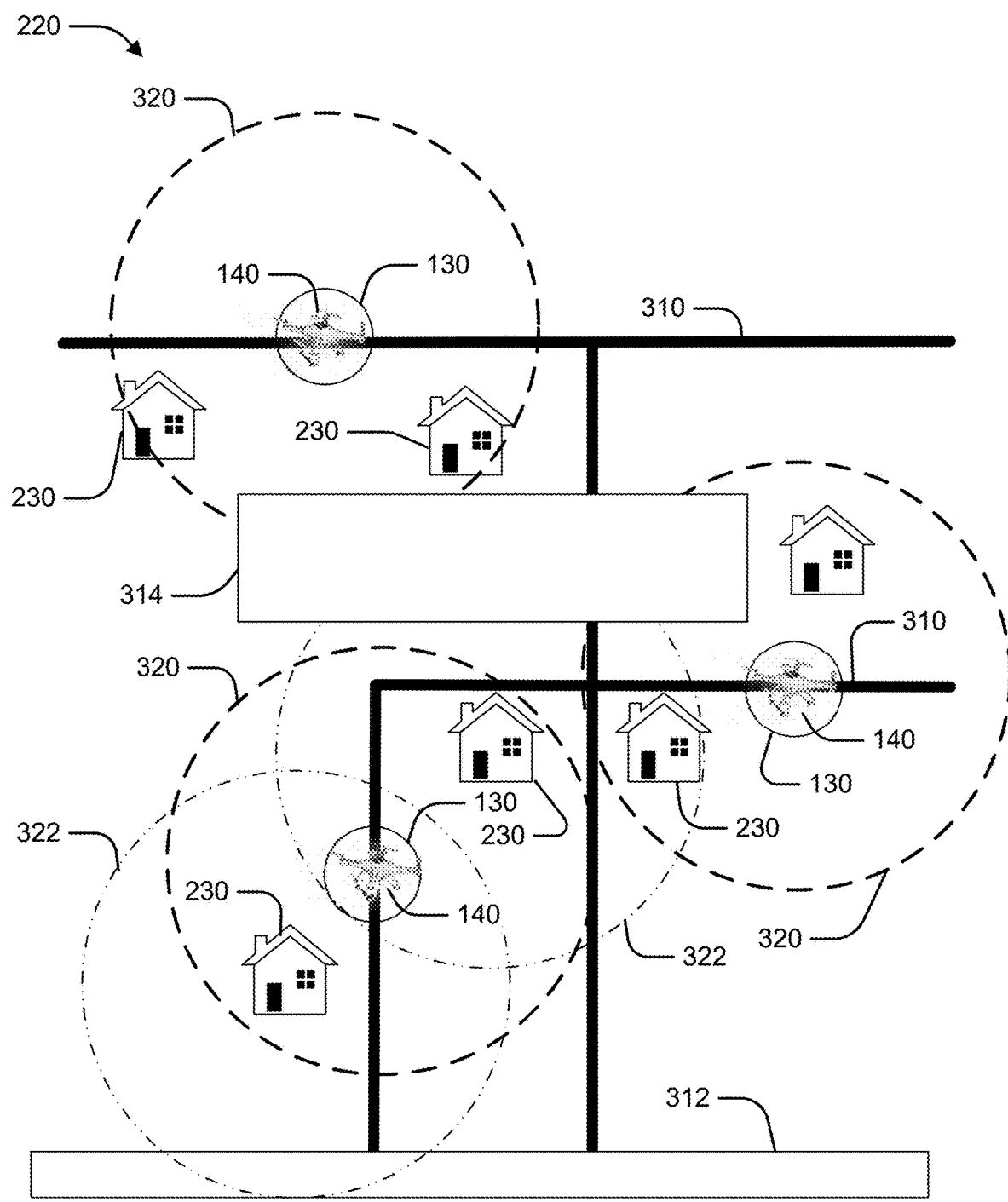
FIG. 3 is a conceptual diagram of example drone routing.

FIG. 3 is a conceptual diagram of example drone routing within a delivery zone 220. The delivery zone 220 may include roads 310 that may be traversed by the land vehicle 120 to reach dispatch locations 130. In an aspect, the dispatch locations 130 may be located anywhere along the roads 310 (e.g., in a residential area). In contrast, regulations may prevent land vehicles 120 from stopping along a highway 312 to dispatch UAVs 140. A highway 312 may, however, include designated parking areas that a land vehicle 120 may utilize as a dispatch location 130. Also, the delivery zone 220 may include one or more restricted areas 314 that are areas designated as off limits to the flight path of UAVs 140, such as areas associated with an airport or a government building, or, in some cases, private property. Accordingly, neither dispatch locations 130 nor UAV routes may be located in the restricted area 314. The vehicle and drone management computer system 112 may maintain a database of restricted areas 314 within each geographic region 210. For example, in one implementation, the vehicle and drone management computer system 112 may generate the database by applying rules to existing databases such as road databases and property records.

The vehicle and drone management computer system 112 may route the land vehicle 120 by determining a set of dispatch locations 130 within the zone 220. The dispatch locations 130 may be based on the destinations 230 and the drone range 320. Dispatch locations 130 may be selected that maximize the number of destinations 230 within the drone range 320 from the dispatch locations 130. In an aspect, the dispatch locations 130 may be selected by determining a dispatch area 322 for each destination 230, then selecting dispatch locations 130 where the most dispatch areas 322 overlap. A dispatch area 322 may refer to an area surrounding a destination 230 from which a UAV 140 may be dispatched to deliver a package to the destination 230. For example, the dispatch area 322 may be centered on the destination 230 and have a radius based on the range of the UAV 140. Accordingly, the UAV 140 may be dispatched from any dispatch location 130 within the dispatch area 322 and return to any dispatch location 130 or 132 within the dispatch area 322. Destinations 230 covered by a selected dispatch location 130 may be removed from the set of destinations 230 to be covered and another dispatch location 130 selected based on the remaining destinations 230 until every destination 230 is covered by a respective dispatch location 130. The selection of dispatch locations 130 may also need to account for restricted areas 314. For example, although a given dispatch location 130 within the restricted area 314 may cover one or more destinations 230, less convenient dispatch locations 130 may be selected to avoid placing the dispatch location 130 (and/or the flight path of UAVs 140) within the restricted area 314.

In an aspect, each UAV 140 may be autonomously piloted based on a route provided by the vehicle and drone management computer system 112 using autonomous navigation rules. Further, each UAV 140 may be provided with GPS data for a delivery destination 230, and, optionally, with a street address. Each UAV 140 may also be provided with the GPS location and/or physical street location of the dispatch point within the dispatch location 130, or determine the location of the dispatch point based on GPS measurements. The UAV 140 may calculate the route from the dispatch location 130 to the physical delivery address of the respective delivery destination 130 using the autonomous navigation rules. In an aspect, a preferred route is a direct path from the dispatch location 130 to the physical delivery address or other designated drop-off location of the respective delivery destination 130 to minimize time and energy (battery) usage. For example, a default autonomous navigation rule may be to determine a straight path from the dispatch location 130 to the destination 230 at a specified height. The UAV 140 and/or the vehicle and drone management computer system 112 may completely or partially (e.g., both in combination) plan a route around known obstacles (trees, power lines, buildings, towers etc.) by using stored geometric information. For example, the autonomous navigation rules may include a rule to avoid known obstacles by a configured distance (e.g., 10 feet). Additionally, the UAV 140 may navigate around obstacles using the on-board camera system to locate objects and maintain a specified distance, which may be the same as the configured distance from known obstacles, or a different distance (e.g., 5 feet). In an aspect, the UAV 140 may perform object identification on obstacles using the on-camera system. The UAV 140 may recognize and categorize an obstruction and then make a decision as to the threshold distance and/or the most effective mitigation action. Local regulations may preclude the transit of the UAV 140 over private property, which may also be considered a type of restricted area 314, in which case the UAV 140 may use autonomous navigation rules to determine a route over public roadways, alleyways, and other public rights of way. For example, the autonomous navigation rules may designate the restricted areas 314, and the UAV 140 may autonomously select a route that avoids the restricted areas 314.

When the UAV 140 reaches a respective destination 230, the UAV 140 may deliver the package. In an aspect, the respective destination 230 may be associated with specific delivery instructions. For example, a customer may submit delivery instructions when placing an order. The delivery instructions may include specific GPS coordinates of a drop off location within a property to deliver the package or recognizable objects to orient the UAV 140. For example, recognizable objects may include a landing pad, beacon, markings, building facade, door frame, or other feature having optically recognizable characteristics. The UAV 140 may use the onboard camera to identify the recognizable object, then orient itself with respect to the recognizable object. The UAV 140 may release the package at the destination 230. The UAV 140 may also document delivery of the package. For example, the UAV 140 may record a video or photograph of the package at the destination 230.

In an aspect, the UAV 140 may encounter difficulties that cannot be resolved autonomously. For example, the UAV 140 may encounter a barrier or the UAV 140 may become damaged. The UAV 140 may transmit its current location to the land vehicle 120 for the operator to assist the UAV 140. Because the land vehicle 120 is within the round trip distance of the UAV 140, the operator may be significantly closer to the UAV 140 than an operator at the warehouse 110. In some cases, the operator may retrieve a disabled drone and complete the delivery.

Figure 4:
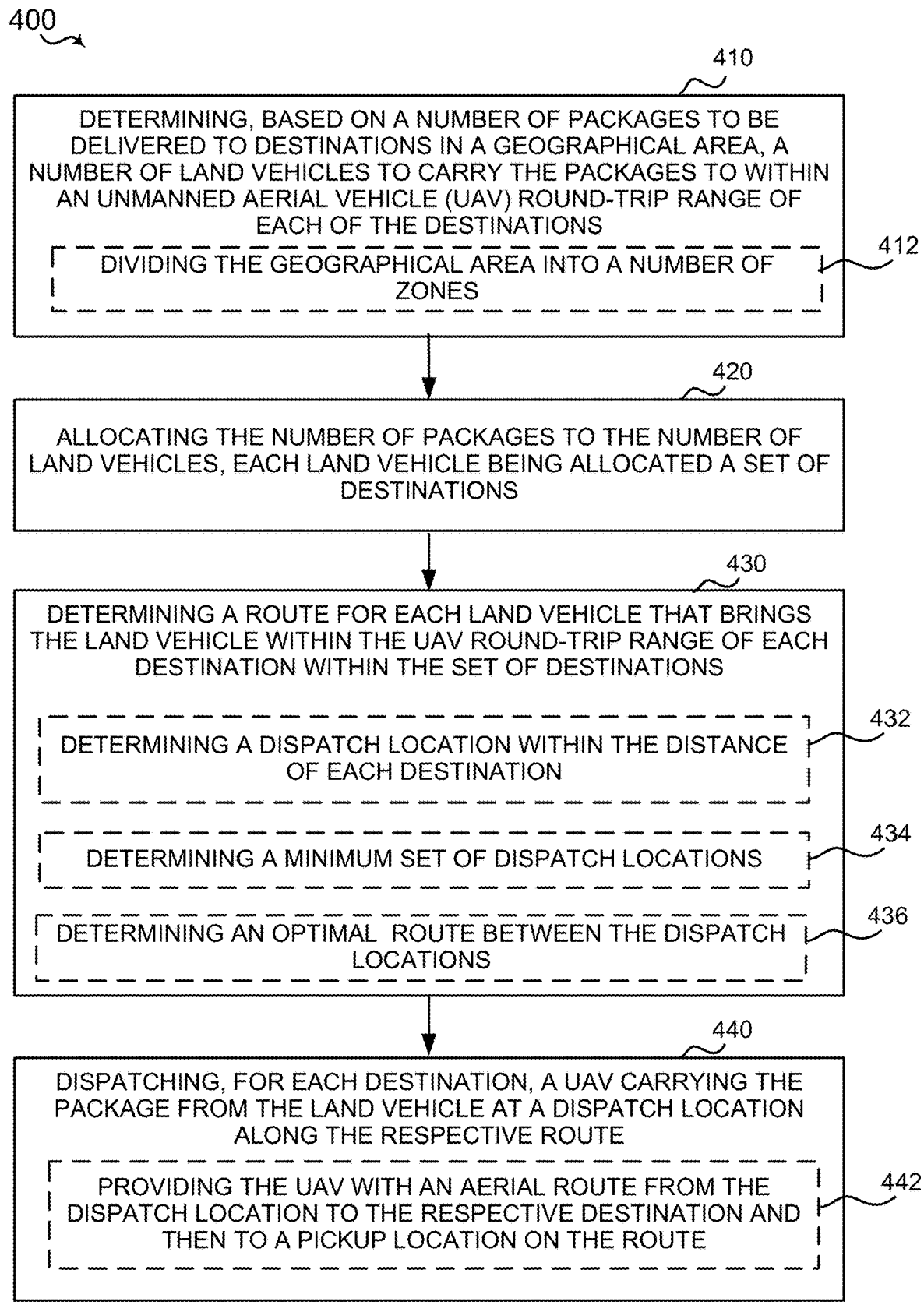
FIG. 4 is a flowchart of an example method of delivering packages using a management system.

FIG. 4 is a flowchart of an example method 400 of delivering packages using the vehicle and drone management computer system 112. The vehicle and drone management computer system 112 may communicate with various components of the management system 100, for example via a wireless data connection, to provide instructions for controlling the component or providing input into an autonomous control process.

In block 410, the method 400 may include determining, based on a number of packages to be delivered to destinations in a geographical area, a number of land vehicles to carry the packages to within a round-trip range of each of the destinations. In an aspect, for example, the allocation component 114 of the vehicle and drone management computer system 112 may determine, based on a number of packages to be delivered to destinations 230 in the geographic region 210, the number of land vehicles 120 to carry the packages to within the UAV round-trip range of each of the destinations. The round-trip range may be based on a round trip range of at least one UAV 140 carried on each land vehicle 120. The number of land vehicles 120 may be based on the range and capacity of each land vehicle 120 and the round trip range of the UAVs 140. In sub-block 412, the block 410 may optionally include dividing the geographical area into a number of zones. For example, the allocation component 114 of the vehicle and drone management computer system 112 may divide the geographic region 210 into a number of zones 220. Each zone 220 may have a substantially equal number, volume, or weight of packages.

In block 420, the method 400 may include allocating the number of packages to the number of land vehicles, each land vehicle being allocated a set of destinations. In an aspect, for example, the allocation component 114 may allocate the number of packages to the number of land vehicles 120, each land vehicle 120 being allocated a set of destinations 230 within a respective zone 220.

In block 430, the method 400 may include determining a route for each land vehicle that brings the land vehicle within the UAV round-trip range of each destination within the set of destinations. In an aspect, for example, the routing component 116 may determine a route for each land vehicle 120 that brings the land vehicle 120 within the UAV round-trip range of each destination 230 within the set of destinations. In sub-block 432, the block 430 may include determining a dispatch location 130 within the UAV round-trip range of each destination 230. In an aspect, for example, the vehicle and drone management computer system 112 of the management system 100 may determine the dispatch location 130 within the drone range 320 of each destination 230. In sub-block 434, the block 430 may optionally include determining a minimum set of dispatch locations. In an aspect, for example, the routing component 116 may determine the minimum set of dispatch locations 130. For example, the vehicle and drone management computer system 112 may select dispatch locations 130 that maximize the number of destinations 230 within the drone range 320. In sub-block 436, the block 430 may optionally include determining an optimal route between the dispatch locations. In an aspect, for example, the routing component 116 of the vehicle and drone management computer system 112 may determine an optimal route between the dispatch locations 130. The optimal route may be a shortest or fastest route between the dispatch locations 130. For example, the computer system 112 may determine the optimal route using the dispatch locations 130 as input into known routing algorithms for land vehicles 120.

In block 440, the method 400 may include dispatching, for each destination, a UAV carrying the package from the land vehicle at a dispatch location along the respective route. In an aspect, for example, the dispatch component 118 may dispatch, for each destination 230, the UAV 140 carrying the package from the land vehicle 120 at the dispatch location 130 along the respective route. In sub-block 442, the block 440 may optionally include providing the UAV with an aerial route from the dispatch location to the respective destination and then to a pickup location on the route. The pickup location may be, for example, the second dispatch location 132. In an aspect, for example, the dispatch component 118 may provide the UAV 140 with the aerial route from the dispatch location 130 to the respective destination 230. The dispatch component 118 may also provide an aerial route from the respective destination 230 to a pickup location, which may be the same as the dispatch location 130, or may be a second dispatch location 132. The UAV 140 may then autonomously navigate along the aerial route. If the UAV 140 diverges from the aerial route by a threshold amount, control of the UAV 140 may be passed to an operator at the land vehicle 120 or an operator at a more remote location, who may control the UAV 140 based on input from the GPS sensor and the on board camera.

Figure 5:
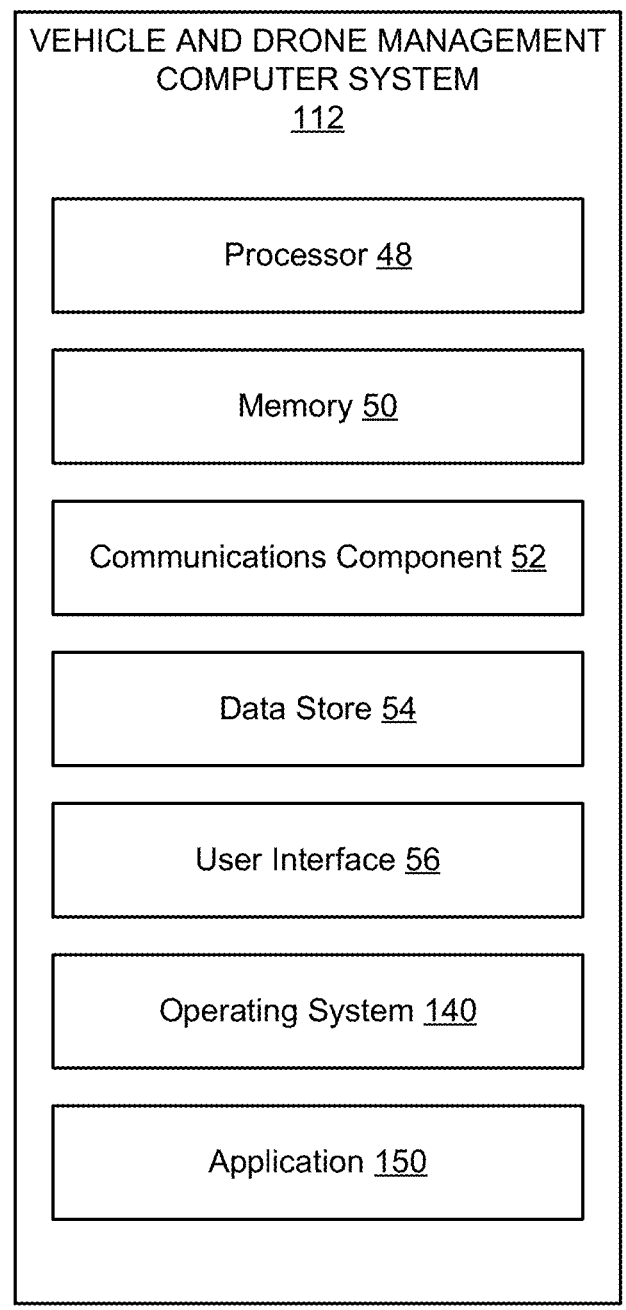
FIG. 5 is a block diagram of an example of the vehicle and drone management computer system.

FIG. 5 is a block diagram of an example of the vehicle and drone management computer system 112 in accordance with an implementation, including additional component details as compared to FIG. 1. In one example, vehicle and drone management computer system 112 may include processor 48 for carrying out processing functions associated with one or more of components and functions described herein. Processor 48 can include a single or multiple set of processors or multi-core processors. Moreover, processor 48 can be implemented as an integrated processing system and/or a distributed processing system. In an implementation, for example, processor 48 may include a central processing unit (CPU). In an example, vehicle and drone management computer system 112 may include memory 50 for storing instructions executable by the processor 48 for carrying out the functions described herein. In an implementation, for example, memory 50 may store instructions for executing one or more of the allocation component 114, routing component 116, or dispatch component 118.

Further, vehicle and drone management computer system 112 may include a communications component 52 that provides for establishing and maintaining communications with one or more parties, vehicles, or drones, utilizing hardware, software, and services as described herein. Communications component 52 may carry communications between components on vehicle and drone management computer system 112, as well as between vehicle and drone management computer system 112 and external devices, such as devices located across a communications network and/or devices serially or locally connected to vehicle and drone management computer system 112. For example, communications component 52 may include one or more buses, and may further include transmit chain components and receive chain components associated with a transmitter and receiver, respectively, operable for interfacing with external devices.

Additionally, vehicle and drone management computer system 112 may include a data store 54, which can be any suitable combination of hardware and/or software, that provides for mass storage of information, databases, and programs employed in connection with implementations described herein. For example, data store 54 may be a data repository for operating system 140 and/or applications 150.

Vehicle and drone management computer system 112 may also include a user interface component 56 operable to receive inputs from a user of computer device 102 and further operable to generate outputs for presentation to the user. User interface component 56 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 56 may include one or more output devices, including but not limited to a display, a speaker, a haptic feedback mechanism, a printer, any other mechanism capable of presenting an output to a user, or any combination thereof.

In an implementation, user interface component 56 may transmit and/or receive messages corresponding to the operation of operating system 140 and/or application 150. In addition, processor 48 executes operating system 140 and/or application 150, and memory 50 or data store 54 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/ or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

The invention claimed is:

1. A method of delivering packages, comprising:
   determining, based on a number of packages to be delivered to destinations in a geographical area, a number of land vehicles to carry the packages to within an unmanned aerial vehicle (UAV) round-trip range of each of the destinations, wherein each land vehicle carries at least one UAV capable of delivering at least one of the number of packages to one of the destinations within the UAV round-trip range;
   allocating the number of packages to the number of land vehicles, each land vehicle being allocated a set of destinations;
   determining a route for each land vehicle that brings the land vehicle within the UAV round-trip range of each destination within the set of destinations, wherein determining the route for each land vehicle comprises:
      establishing a dispatch area for each destination by determining a radius around each destination, wherein the radius is within the UAV round-trip range;
      detecting locations where dispatch areas for different destinations overlap;
      assigning a dispatch location at a location where the most dispatch areas overlap;
      removing destinations covered by the selected dispatch location from the set of destinations; and
      assigning another dispatch location until every destination is covered by a respective dispatch location, wherein each dispatch location allows parking of the land vehicle; and
   dispatching, for each destination, the at least one UAV carrying the package from the land vehicle at the selected dispatch location for the destination along the respective route, wherein each land vehicle includes a UAV bay for storing one or more UAVs and UAV support equipment, and wherein dispatching includes refreshing power on the at least one UAV to increase or maintain the UAV round-trip range.

2. The method of claim 1, wherein the dispatching comprises providing the UAV with an aerial route from the dispatch location to the respective destination and then to a pickup location on the route.

3. The method of claim 2, wherein the dispatch location and the pickup location are the same.

4. The method of claim 2, wherein the aerial route comprises geographic coordinates of the dispatch location, the respective destination, and the pickup location and autonomous navigation rules.

5. The method of claim 4, wherein the autonomous navigation rules include indications of restricted areas proximate the respective destination.

6. The method of claim 1, wherein determining the number of land vehicles is based on a range and a capacity of each land vehicle and the UAV round-trip range.

7. The method of claim 6, wherein the UAV round-trip range is based on one or more of battery capacity, battery charge level, altitude, temperature, wind speed, package weight, and safety margin.

8. The method of claim 1, wherein determining the number of land vehicles comprises dividing the geographical area into a number of zones.

9. The method of claim 1, wherein determining the route for each land vehicle comprises selecting the route between the dispatch locations based on speed or distance.

10. The method of claim 1, wherein the destinations include pick up locations where at least one UAV is to pick up a package and transport the package to the land vehicle, the method further comprising dispatching, for each pick up location, the at least one UAV at the dispatch location along the respective route.

11. A system for delivering packages, comprising:
a plurality of land vehicles;
a plurality of unmanned aerial vehicles (UAVs), wherein each of the plurality of land vehicles carries at least one of the plurality of UAVs, wherein each land vehicle includes a UAV bay for storing one or more UAVs and UAV support equipment; and
a computer system comprising a memory storing computer executable instructions and a processor configured to:
determine, based on a number of packages to be delivered to destinations in a geographical area, a number of the land vehicles to carry the packages to within a UAV round-trip range of each of the destinations;
allocate the number of packages to the number of land vehicles, each land vehicle being allocated a set of destinations;
determine a route for each land vehicle that brings the land vehicle within the UAV round-trip range of each destination within the set of destinations, wherein the processor is configured to determine the route by:
establishing a dispatch area for each destination by determining a radius around each destination, wherein the radius is within the UAV round-trip range;
detecting locations where dispatch areas for different destinations overlap;
assigning a dispatch location at a location where the most dispatch areas overlap;
removing destinations covered by the selected dispatch location from the set of destinations; and
assigning another dispatch location until every destination is covered by a respective dispatch location, wherein each dispatch location allows parking of the land vehicle; and
dispatch, for each destination, a UAV carrying the package from the land vehicle at the selected dispatch location for the destination along the respective route, wherein the UAV bay is configured to refresh power on the at least one UAV to increase or maintain the UAV round-trip range.

12. The system of claim 11, wherein the processor is configured to provide the UAV with an aerial route from the dispatch location to the respective destination and then to a pickup location on the route.

13. The system of claim 12, wherein the dispatch location and the pickup location are the same.

14. The system of claim 12, wherein the aerial route comprises coordinates of the dispatch location, respective destination, and pickup location, and autonomous navigation rules.

15. The system of claim 14, wherein the autonomous navigation rules include indications of restricted areas proximate the respective destination.

16. The system of claim 11, wherein the processor is configured to determine the number of land vehicles based on a range and a capacity of each land vehicle and the UAV round-trip range.

17. The system of claim 16, wherein the UAV round-trip range is based on one or more of battery capacity, battery charge level, altitude, temperature, wind speed, package weight, and safety margin.

18. The system of claim 11, wherein the destinations include pick up locations where one of the UAVs is to pick up a package and transport the package to the land vehicle, wherein the processor is configured to dispatch, for each pick up location, the at least one UAV at the dispatch location along the respective route.

* * * * *